Jan. 4, 1966   A. S. JOHNSON   3,227,005
GEARLESS TRANSMISSION
Filed June 21, 1961   2 Sheets-Sheet 1

ALLAN S. JOHNSON
INVENTOR.

BY

ATTORNEY

Jan. 4, 1966 A. S. JOHNSON 3,227,005
GEARLESS TRANSMISSION
Filed June 21, 1961 2 Sheets-Sheet 2

ALLAN S. JOHNSON
INVENTOR.

BY
ATTORNEY

United States Patent Office 3,227,005
Patented Jan. 4, 1966

3,227,005
GEARLESS TRANSMISSION
Allan S. Johnson, Costa Mesa, Calif., assignor to
Tapmatic Corporation
Filed June 21, 1961, Ser. No. 118,658
7 Claims. (Cl. 74—798)

This application is a continuation-in-part of my earlier application, Serial No. 829,303, filed July 24, 1959, now Patent No. 3,041,893.

This invention relates to an improved variable speed transmission capable of operating either as a speed reducer or a speed increaser. The variable speed transmission of this invention is gearless, the speed transmission being by way of ball bearings as described hereinafter.

There are many applications for variable speed transmissions, particularly for speed reduction, some of these applications occurring in the field of missle development.

The primary object of this invention lies in the concept of the use of balls for speed transmission (either in a speed reducer or a speed increaser) and the implementation of the concept by way of particular devices embodying the principle.

Another object is to provide an improved variable speed transmission characterized in that it is considerably lighter and more compact.

In the implementation of the concept herein, the balls are preferably held in ball races. In some forms of the invention, the ball races are held and the balls rotate as planetary elements. In other forms of the invention, the ball races themselves rotate with the balls in them. It is an object of the invention to achieve and realize the advantages flowing from both these types of construction.

Another object is to provide an improved variable speed transmission, as described, in which friction and wear are reduced to a minimum.

Another object of the invention is to provide a variable speed transmission as in the foregoing wherein heating of the device as a result of operation is minimized.

Another object is to provide variable speed transmission units or elements constituting modules which can be stacked whereby to provide, as desired, virtually unlimited speed ratios, that is, either speed reductions or speed increases. The concept of using balls in the speed transmission lends itself to this adaptation, it being possible to provide simplified elements or modules, as described hereinafter, which are connected to each other merely by stacking one on another to thereby increase or reduce the ratio of speeds.

In practicing the invention, the elements which are utilized are modified standard commercial ball bearings. Standard commercial ball bearings have a clearance of from .0010 to .0015 inch between the balls and the races. In practicing this invention, larger balls are used in the races to provide for a metal to metal fit or a fit in which the clearance is reduced to .0001 inch. Such modified bearings are described more in detail in my earlier application, Serial No. 829,303, filed July 24, 1959, now Patent No. 3,041,893, of which this application is a continuation-in-part. It is to be understood, of course, as pointed out hereinafter, that bearings may be particularly constructed in any size for practicing the invention. Ordinary commercial ball bearings unmodified would be inoperative for purposes of the invention.

Further objects and additional advantages of the invention will become apparent from the following detailed description, claims and annexed drawings wherein:

Figure 1:
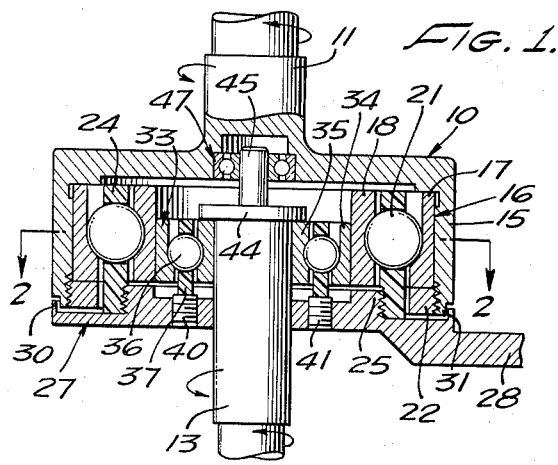
FIG. 1 is a sectional view of a preferred form of the invention.
Figure 2:
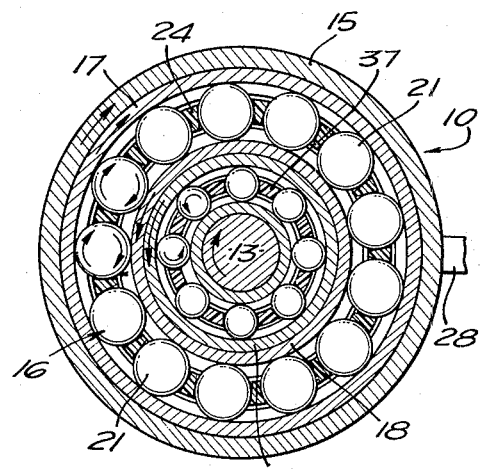
FIG. 2 is a sectional view taken along the line 2—2 of FIG. 1.

FIGS. 1 and 2 of the drawings show a form of the invention in which the ball retainers are held from rotation. The device of FIGS. 1 and 2 is a cylindrical device having the form of a bearing housing. Numeral 10 designates a cylindrical housing having a shaft 11. When the device is operated as a speed increaser, shaft 11 is the driving shaft and another shaft 13 is the driven shaft. The housing 10 has a depending skirt 15 in the position shown in FIG. 1 and within this skirt there is a bearing 16 comprising bearing members 17 and 18 forming a raceway for the spherical balls 21. The bearing assembly is held in the housing 10 by a threaded ring 22 which bears against the outer member 17. The bearing shown is an angular contact bearing in which the inner member 18 has a groove, as shown, forming the inner part of the raceway for the balls. The outer member 17 has a limited arcuate surface providing the outer part of the ball race. The bearing is preferably of the type described in the foregoing wherein larger sized balls are used in a commercial bearing so as to provide a metal to metal fit to facilitate the transmission of torque. The member 17 does not rotate. The member 18 is rotated as will be described. Numeral 24 designates a cylindrical ball retainer which may be made of a suitable material and preferably, this material is a composition known commercially as "Nylotron." This material is particularly advantageous at higher speeds where centrifugal forces tend to throw the grease out from the bearings. It is a plastic composition having embedded glass fibres and self-lubricating qualities; the material has molybdenum disulfide in it. It is a product of Polymer Corporation, Reading, Pennsylvania. Ball retainers made of other materials may, however, be used.

The lower end of the retainer 24 is internally threaded and is threaded onto a boss 25 extending inwardly from an end plate having an extending arm 28 which may be held in any suitable way to hold the end plate 27 and retainer 24 from rotating. The end plate 27 is round and it has an upstanding peripheral flange 30 which is adjacent a square peripheral shoulder on the lower end of the skirt 15 as designated at 31.

Numeral 33 designates another bearing of smaller diameter similar to the bearing described above. It has an outer race member 34, an inner race member 35, balls 36 and a similar ball retainer 37. This bearing fits tightly within the other bearing, that is, with race member 34 fitting tightly within race member 18 to rotate with it. The ball retainer 37 is similar to the previously described ball retainer and it is also held by the end plate 27 and holding arms 28. Preferably, the holding means comprises the threaded members 40 and 41 in the end plate 27 having central stems attached to the end of the retainer 37; the members 40 and 41 make it possible to adjust the position of retainer 37 to adjust the balls 36 in their raceway.

The inner bearing is on the shaft 13 adjacent to a flange 44 on this shaft. It has a part 45 of smaller diameter journalled in a bearing 47 held in a counterbore in the upper part of the housing 10.

FIG. 2 illustrates the operation of the variable speed transmission of FIG. 1. If shaft 11 is rotated in the direction shown, with the arm 28 being held, the skirt 15 and race member 17 rotate with it. This rotation rotates the balls 21 as shown in FIG. 2. These balls, in turn, transmit the rotation to the inner race member 18 as may be seen in FIG. 2, which rotates in the direction shown. Raceway member 34 rotates with member 18 and this rotation is transmitted to the balls 36 of the inner bearing member which rotate as shown in FIG. 2 transmitting their rotation to the inner raceway member 35 and the shaft 13. Shaft 13, therefore, rotates in the same direction as shaft 11. As may be seen, therefore, the device acts as a speed increaser. If the shaft 13 is driven, then shaft 11 is the driven shaft and the device transmits the drive in the opposite direction as a speed reducer.

It will be apparent that the ratio of speeds as between the shafts is directly dependent on the diameters of the driving and driven members which are the raceway members of the bearings. The driven members being of smaller diameter than their respective driving members, their speed is increased in proportion to the difference in diameter. It can be seen, therefore, that virtually any desired speed ratios can be realized and this can be achieved in a very simple way since commercial ball bearings are available in a vast number of sizes. Very great speed increases and reductions can be accomplished by the use of a greater number of bearings, that is, stages of transmission as will be described hereinafter.

Figure 3:
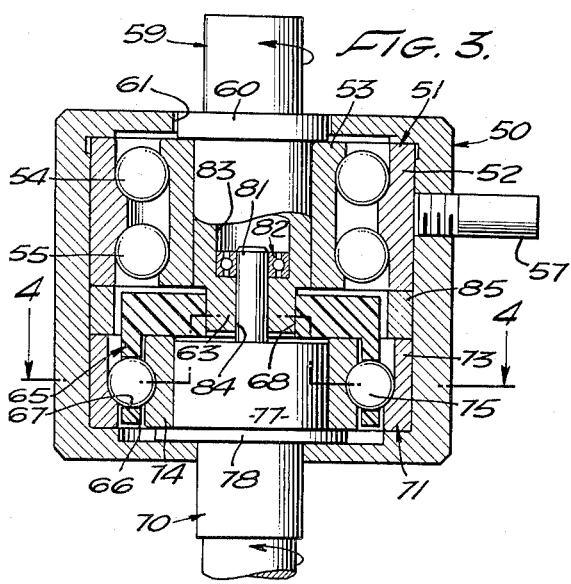
FIG. 3 is a sectional view of a modified form of the invention.
Figure 4:
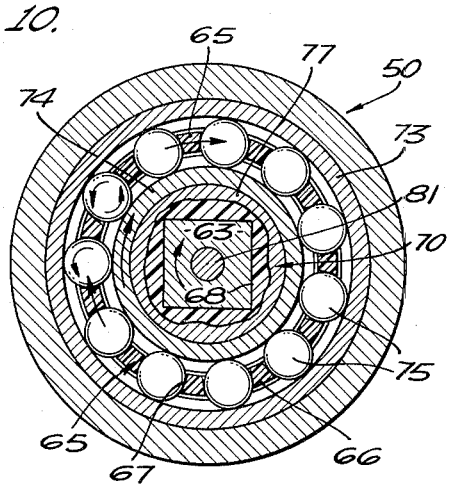
FIG. 4 is a sectional view taken along the line 4—4 of FIG. 3.

FIGS. 3 and 4 show a modified form of the invention which is different in two principle respects. In this form of the invention, the outer housing is not rotated; the drive shaft rotates in a bearing in the housing. Secondly, the ball retainer, instead of being held, is itself rotated. In FIGS. 3 and 4, numeral 50 designates a cylindrical housing having in it a bearing 51. This bearing comprises an outer race member 52 and an inner race member 53. These members provide two raceways with two sets of balls as designated at 54 and 55. The outer race member 51 is held from rotation. It may be held by an extending holding member 57 or merely by the housing 50 itself.

The inner race member 53 is on the shaft 59 which has a flange 60 adjacent the bearing 51 and in an opening 61 in the top of housing 50. The shaft 59 has a square end as designated at 63 which fits into a square opening in a ball retainer 65 which has a depending skirt 66. The skirt 66 has circular openings in it as shown at 67 in FIG. 9. The ball retainer 65 has a square opening at 68 in which is received the square end 63 on the end of shaft 59. The ball retainer 65 removably fits on the end of shaft 59.

The output shaft or the other shaft is designated at 70. Numeral 71 designates a bearing which is like those previously described. It comprises an outer race member 73 fitting within housing 50 and held from rotation thereby. It includes an inner race member 74 and the balls 75 which are in the openings 67 in the ball retainer 65. The shaft 70 has a part 77 of larger diameter snugly fitting within the inner race member 74. The shaft has a flange 78 adjacent the bearings 71 and the bottom wall of the housing 50.

The shaft 70 has an inner part 81 of smaller diameter which is journalled in a bearing 82 held within an internal bore 83 within the other shaft 59. The stem 81 extends through a bore 84 in the end of shaft 59. The shafts are, of course, relatively rotatable.

The operation of the device of FIGS. 3 and 4 will be obvious from the foregoing. If shaft 59 is driven, it rotates in its bearings and its square end part drives the ball retainer 65. This rotates the balls 75 about the axis of the shafts and they rotate in the manner of planetary members as shown in FIG. 4. That is, the balls 75 are caused to rotate and also to revolve by reason of their engagement with the fixed raceway member 73. The balls drive the inner race member 74, as shown in FIG. 4, so that shaft 70 is driven in the same direction as shaft 59. The speed increase is determined by the relative diameter of the race member 73, that is, its internal diameter, and the diameter of the driven member, that is, the race member 74.

The device may also be operated as a speed reducer. If the shaft 70 is driven, the balls 75 are driven as planetary members and they drive or cause the ball retainer 65 to rotate which rotates the shaft 59.

As shown in FIGS. 3 and 4, there is provided a ring or bushing 85 between the bearings 51 and 71. The structure adapts itself to multiplying the number of stages, steps or multiplications of speed increase or reduction. Additional "stages" or steps may be constructed as an integral assembly or unit in the form of a separate, discrete module and these modules may be assembled by simply stacking them to vary the amount of speed change, that is, the ratio. This arrangement will be described in detail hereinafter.

Figure 5:
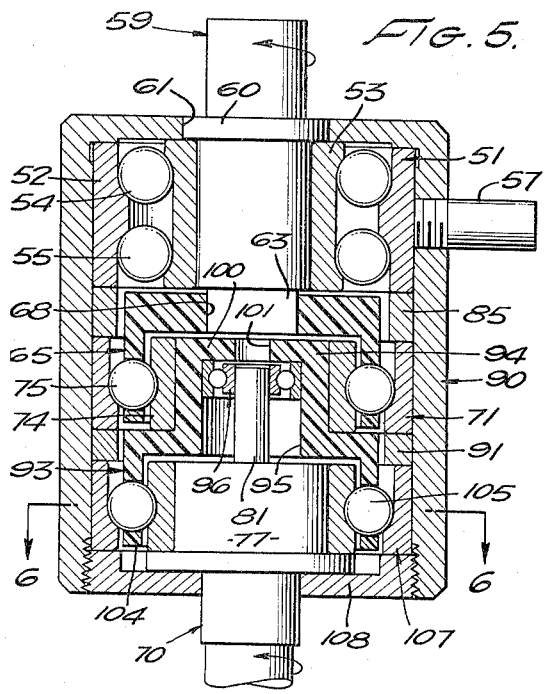
FIG. 5 is a sectional view of another modified form of the invention.
Figure 6:
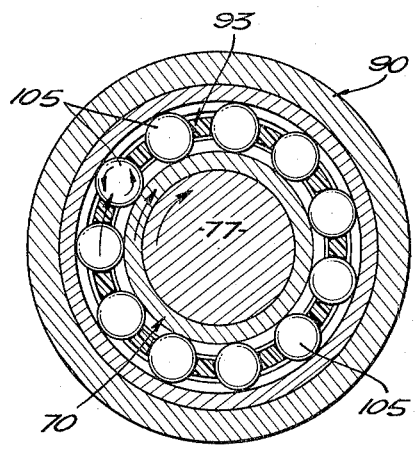
FIG. 6 is a sectional view taken along the line 6—6 of FIG. 5.

FIGS. 5 and 6 illustrate the adaptation of the form of the invention of FIGS. 3 and 4 to additional stages or steps of speed variation. Parts in FIGS. 5 and 6 which are the same as or similar to corresponding parts in FIG. 3 or 4 are numbered the same. It will be observed that the construction in FIGS. 5 and 6 is essentially like that in FIGS. 3 and 4 but with the addition of another stage or step of speed variation. The stages in FIG. 5 are spaced by a bushing 91 similar to the bushing 85 which spaces the first stage, i.e. bearing 71 from the bearing 51. In this form of the invention, the inner race member 74 of bearing 71 drives another ball retainer designated generally by numeral 93. This ball retainer has an upper cylindrical part 94 which fits snugly within the inner race member 74 and it has a bore 95 within which is held a bearing 96. The stem 81 on shaft 70 is journalled in the bearing 96. The retainer 93 has an inner end part 100 with an opening or bore 101 in it.

Figure 9:
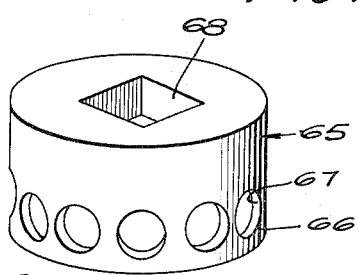
FIG. 9 is a perspective view of a preferred form of ball retainer.

The retainer 93 has a depending skirt 104 which is like the skirt 66 of the retainer of FIG. 9. It has similar openings retaining balls 105 which move in a raceway formed by race members of another similar bearing designated generally at 107 in the end part of housing 90. The lower end of housing 90 is internally threaded and is closed by a threaded end plate 108 which holds the outer race member of bearing 107. The end part 77 of shaft 70 snugly engages in the inner race member of bearing 107.

The operation of the device of FIGS. 5 and 6 will be readily understood by those skilled in the art. The housing 90 is held against rotation. Shaft 59 drives the retainer 65 which, in turn, drives the second ball retainer 93 in the manner shown in FIG. 6 and similar to the manner of drive described in connection with FIGS. 3 and 4. The inner race member 74 of the bearing 71 drives the second retainer 93. The inner race member of bearing 107 and shaft 70 are driven in the manner shown in FIG. 6.

Figure 10:
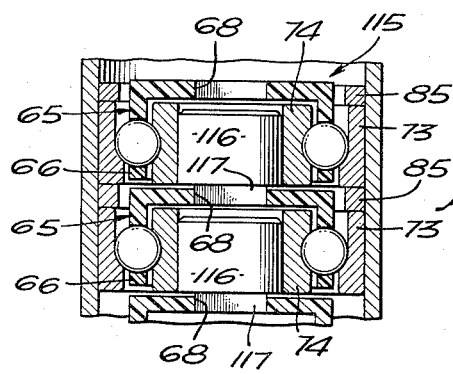
FIG. 10 is a sectional view illustrating modular construction and stacking of speed transmission units.

The speed increase depends upon the relative diameter of driving and driven members as described in connection with previous embodiments and, of course, also on the number of "stages." FIG. 10 illustrates the manner of adding stages by way of stacking modular units as previously referred to. Numeral 115 in FIG. 10 designates generally one of the stages in the for mof a removable modular unit. Each of the units or stages 115 is like the bearing 71 and the retainer 65 of FIG. 3. Each of these stages or modules includes a member 116 having a cylindrical part as shown fitting snugly within the inner raceway and having an extending square end 117. The square end 117 fits into the square opening 68 in the next ball retainer 65. It may be seen, therefore, that the stages or modules may be stacked on each other as shown to provide any desired amount of speed increase or reduction. The modules may be incorporated in a housing like that of FIG. 5, with modules being removed or added simply by removing the end plate 108, the bushings such as shown at 85 being used between modules.

Figure 7:
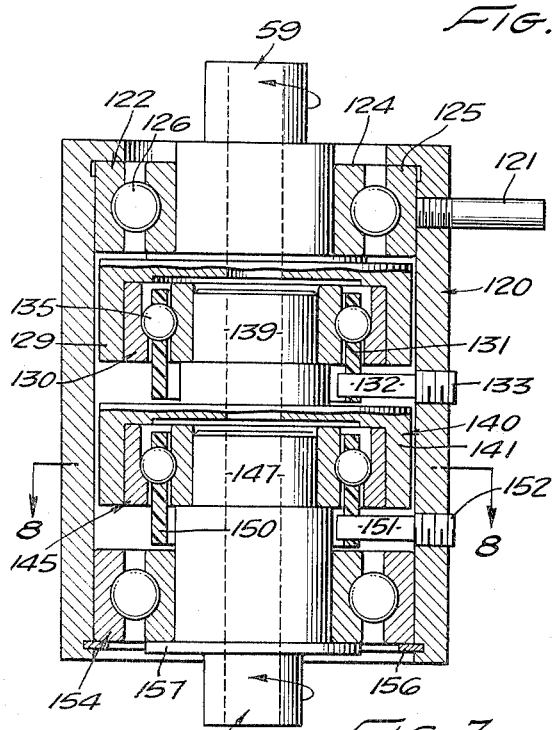
FIG. 7 is a sectional view of another modified form of the invention.
Figure 8:
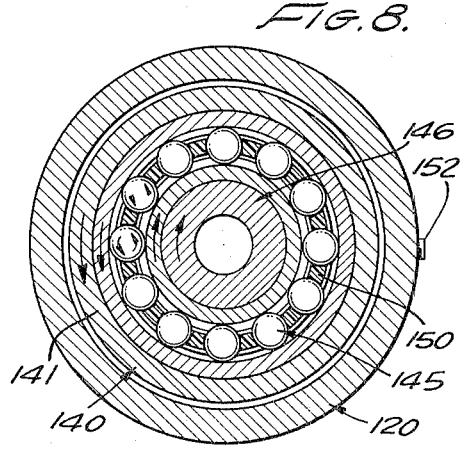
FIG. 8 is a sectional view taken along the line 8—8 of FIG. 7.

FIGS. 7 and 8 of the drawings show another modified form of the invention. In this form of the invention, the housing does not rotate and in this respect this modification is like that of FIGS. 3 to 6. However, in this modification, the ball retainers are held against rotation as in FIG. 1. FIGS. 7 and 8 illustrate a manner of increasing the number of stages in this type of device where the ball retainers do not rotate, the stages being disposed axially relative to each other. In FIGS. 7 and 8, numeral 120 designates a cylindrical housing which does not rotate; it may be held by holding member 121 or otherwise. Shaft 59 rotates in a bearing 122 which is a standard type of ball bearing held in the upper part of housing 120. This bearing has inner and outer race members 124 and 125 and balls 126, the raceways having arcuate grooves which hold the balls as shown. The shaft 59 has an integral depending skirt part 129 which is similar to the skirt 15 in FIG. 1. Within this skirt is bearing 130 which is like the bearing 16 of FIG. 1. The ball retainer of bearing 130 is designated at 131 and it is held by a stem 132 having a threaded part 133 threaded into the side of the housing 120 as shown. The balls of the bearing 130 are designated at 135. The inner race member of bearing 130 snugly fits a part 139 of shaft 140 having a depending skirt 141 which is like the skirt 129 and drives the next unit which is similar. The next unit has a bearing 145 which is like the bearing 130 and it drives a shaft 146 having a part 147 of smaller diameter fitting snugly within inner race member of bearing 145. The ball retainer 150 of this unit is held by a similar stem 151 having a threaded part 152 threaded into the side of the housing 120.

The shaft 146 rotates in a bearing 154 which is like the bearing 122 at the other end of the unit and is held in the housing by a snap ring 156. The shaft 146 has a flange 157 adjacent the bearing 154 to hold it.

The operation of the unit of FIG. 7 will be understood from the description of operation of the previous embodiments. The ball retainers are held against rotation as in FIGS. 1 and 2. Shaft 59 drives the skirt 129 which, in turn, drives the member 140 through the balls 135. This, in turn, drives the skirt 141 of the next unit which drives the shaft 146 in the manner illustrated in FIG. 8. A speed increase is realized at each stage or step depending upon the relative diameters of the driving and driven elements. As in the previous embodiments, the drive through the unit may be in the reverse direction to effect a comparable speed reduction.

From the foregoing, those skilled in the art will observe that the invention achieves and realizes all of the objects and advantages as stated in the foregoing, as well as additional advantages which are more aparent from the detailed description. Any size angular contact bearings can be used depending only on the torque output required. Any number of assemblies or modules such as shown in FIG. 10 can be stacked in order to achieve virtually any desired ratio of speed increase or reduction. In addition to available commercial bearings, special bearings can be built to give any desired exact ratio of speed increase or reduction. The desired torque output is achieved as described, that is, by selecting balls of a size to provide a metal to metal fit in the units. Speeds as high as 36,000 r.p.m. can readily be achieved and in speed reducers, input speeds as high as 36,000 r.p.m are possible. The units as described herein are much smoother than gears in operation and there is no backlash. An exemplary form of the invention which was reduced to practice was tested by continuous running for fifty (50) hours at 3,000 r.p.m. input, and 19,500 r.p.m. output at normal operating temperatures of about 95° Fahrenheit. It was found that as the device is first used, and before the grease and other parts are warmed, the warm-up friction may occasion an increase in temperature to about 145° F., for about the first two hours. Then, the apparatus cools back to about 95° F. as stated, running temperature. After the device has been used the first time for two or three or more hours, it appeared that even the warm-up temperature is not above 100° F. The aforesaid device has also been used for 150 continuous hours of testing, showing no wear at all, indicating that the invention is superior from the standpoint of being much less subject to wear.

The foregoing disclosure is representative of preferred forms of the invention and is to be interpreted in an illustrative rather than a limiting sense, the invention to be accorded the full scope of the claims appended hereto.

I claim:

1. In a gearless transmission, in combination, means comprising a first member, a concentric rotary driven member of a different diameter, said members being of fixed diametrical size and forming a ball race therebetween, torque transmitting balls in said ball race having metal to metal contact with the first and driven members, said balls having a size to be held sufficiently tightly between the members whereby torque may be transmitted to the driven member through the said balls without application of loading force to said members, a ball retainer member, and means for holding the ball retainer to prevent it from rotating.

2. A device comprising a plurality of the units of claim 1 connected between a driven shaft and a driving shaft.

3. A device as in claim 2, wherein said units are of different size and are arranged one within another.

4. A device comprising a plurality of units as in claim 3 connected to each other and being axially disposed relative to each other between a driven shaft and a drive shaft.

5. A modular unit in the form of an assembly providing a stage adapted for stacking to providing different ratios in a variable speed transmission, comprising circular members of fixed diametrical size including an inner race member, an outer race member and a ball retainer member, one of said members constituting a driving member and one of said members constituting a driven member, said inner and outer members forming a raceway, a plurality of balls in said raceway held in said ball retainer, said balls being of a size to be held sufficiently tightly between the members, that torque can be transmitted through the balls to the driven member without application of loading force to the said member, said driving member having means to engage the driven member of a similar modular unit, and said driven member having means to engage the driving member of another similar modular unit.

6. An assembly comprising a group of the units of claim 5, assembled together in axial relationship with each of the individual units being driven by the one preceding it and driving the next succeeding unit.

7. A unit as in claim 5, wherein each of said driving members comprises a skirt engaging the outer race member of the next unit.

References Cited by the Examiner

UNITED STATES PATENTS

| | | | |
|---|---|---|---|
| 1,986,177 | 1/1935 | Zastoupil | 74—798 |
| 2,383,107 | 8/1945 | Cherry et al. | 74—798 |
| 2,536,803 | 1/1951 | Gleason | 74—798 X |

FOREIGN PATENTS

| | | |
|---|---|---|
| 1,210,839 | 10/1959 | France. |
| 134,541 | 4/1920 | Great Britain. |
| 847,958 | 7/1960 | Great Britain. |
| 229,261 | 1/1944 | Switzerland. |

DON A. WAITE, *Primary Examiner.*